(12) United States Patent
Horng et al.

(10) Patent No.: US 7,456,541 B2
(45) Date of Patent: Nov. 25, 2008

(54) FAN DEVICE HAVING AN ULTRA THIN-TYPE STRUCTURE WITH A MINIMUM AIR GAP FOR REDUCING AN AXIAL THICKNESS

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 509 days.

(21) Appl. No.: 11/329,278

(22) Filed: Jan. 11, 2006

(65) Prior Publication Data
US 2007/0114869 A1    May 24, 2007

(30) Foreign Application Priority Data
Nov. 22, 2005   (TW) ............................... 94140896 A

(51) Int. Cl.
*H02K 7/09*    (2006.01)
(52) U.S. Cl. .................. 310/268; 310/156.32; 310/67 R
(58) Field of Classification Search .................. 310/268, 310/67 R, 156.32
See application file for complete search history.

(56) References Cited

U.S. PATENT DOCUMENTS

| | | | |
|---|---|---|---|
| 4,360,751 A | | 11/1982 | Arnold, Jr. et al. |
| 4,603,271 A | | 7/1986 | Maruyama et al. |
| 4,763,037 A | * | 8/1988 | Hashimoto et al. .......... 310/268 |
| 5,176,509 A | * | 1/1993 | Schmider et al. ......... 417/423.7 |
| 5,217,351 A | | 6/1993 | Meier et al. |
| 5,498,919 A | * | 3/1996 | Bahn .......................... 310/268 |
| 2005/0168088 A1 | * | 8/2005 | Wada et al. ............ 310/156.45 |
| 2006/0091743 A1 | * | 5/2006 | Iwasaki et al. ................. 310/58 |
| 2007/0075597 A1 | * | 4/2007 | Seidler et al. ............. 310/67 R |
| 2007/0114869 A1 | * | 5/2007 | Horng et al. ........... 310/156.32 |

* cited by examiner

*Primary Examiner*—Gary F. Paumen
(74) *Attorney, Agent, or Firm*—Muncy, Geissler, Olds & Lowe, PLLC

(57) ABSTRACT

A fan device includes a base plate, a flat-type impeller, an assembling member, a magnet sheet and a shaft member. The base plate includes an axial hole and at least one stator coil arranged thereon. The flat-type impeller is formed with an annular supporting plate and bent vanes while the assembling member is formed with an assembling hole and an upraised flange. The magnet sheet provides with at least one pair of alternatively opposite magnetic poles (i.e. north pole and south pole). A first distal end of the shaft member is extended through the flat-type impeller and inserted into the assembling hole of the assembling member while a second distal end of the shaft member is inserted into the axial hole of the base plate. The flat-type impeller is positioned and sandwiched in between the assembling member and the magnet sheet so as to constitute a thin-type structure.

18 Claims, 4 Drawing Sheets

FAN DEVICE HAVING AN ULTRA THIN-TYPE STRUCTURE WITH A MINIMUM AIR GAP FOR REDUCING AN AXIAL THICKNESS

BACKGROUND OF THE INVENTION

1. Field of the Invention

The present invention relates to a fan device having an ultra thin-type structure with a minimum air gap for reducing an axial thickness. Particularly, the present invention relates to the fan device including a flat-type impeller to provide with an annular supporting plate and a set of bent vanes connected thereto. More particularly, the present invention relates to the flat-type impeller of the fan device to permit the omission of an upraised wall of a hub portion for reducing the entire axial thickness of the fan device.

2. Description of the Related Art

A conventional small-size fan device, as described in U.S. Pat. No. 5,217,351, entitled "SMALL FAN," includes a fan housing and an impeller rotatably supported therein. The fan housing forms a base plate on which to provide with an axial tube and a pair of stator coils. In common practice, the axial tube accommodates a bearing member which is securely mounted in the axial tube by suitable fastening means. Each of the stator coils has an ordinary or common form of the coil which is circular and flat in form.

Conventionally, provided on the impeller of the fan device are a rotor hub, a set of vane members, a shaft member and a magnet ring member. The rotor hub has an inverted-bowl shape which provides with an outer circumferential surface and an inner space. A series of the vane members are equi-spaced on the outer circumferential surface of the rotor hub, and each of which is extended in a radial direction of the rotor hub. A first distal end of the shaft member is extended into the inner space of the rotor hub, and mounted at a center point of the rotor hub. Correspondingly, a second distal end of the shaft member is extended through and rotatably received in the bearing member.

Generally, the magnet ring member is annular and flat in ordinary form. Mounted in the inner space of the rotor hub is the magnet ring member which is surrounding the shaft member and has a longitudinal alignment with the stator coils. Typically, the magnet ring member provides with at least one or more sets of alternatively opposite magnetic poles corresponding to the number of the stator coils.

In rotational operation, the impeller is turned about the shaft member when the stator coils are actuated to generate an alternatively magnetic field which can repulse the set of the alternatively opposite magnetic poles of the magnet ring member mounted in the impeller. This results in rotation of the impeller to drive cooling air through the fan housing for heat dissipation or ventilation purpose.

In general, a number of design limitations exist for the above-mentioned type of the small-size fan device. These design limitations are given as follows: the fan housing and the impeller of the above-mentioned type of the fan device are typically made of plastic, and are manufactured in a plastic molding process. In order to ensure good molding quality of products and to perfectly cooperate with a molding machine, the rotor hub of the impeller must be sized greater than a predetermined size so that dimensions of the rotor hub cannot be further reduced. In particular, an axial thickness of the rotor hub cannot be further reduced. In addition, in order to combine the rotor hub with the shaft member, the inner space of the rotor hub must provide with an axial seat which is integrally formed and projected from the center point. Inevitably, the axial seat has an axial height that possesses a section of the axial thickness of the rotor hub. Consequently, the axial thickness of the rotor of the conventional small-size fan device cannot be less than 5 mm, for example. Accordingly, there are difficulties in minimizing dimensions and reducing weight of the fan device. Hence, there is a need for improving the design of the conventional small-size fan device to achieve compact and low weight features.

The present invention intends to provide a fan device including a flat-type impeller to provide with an annular supporting plate and a set of bent vanes connected thereto. The annular supporting plate of the flat-type impeller is directly positioned and sandwiched in between an assembling member and a magnet sheet such that the flat-type impeller permits the omission of an upraised wall of a hub portion for reducing the entire axial thickness of the fan device. Accordingly, the flat-type impeller is so configured to carry out a thin-type structure of the fan device in such a way as to mitigate and overcome the above problem.

SUMMARY OF THE INVENTION

The primary objective of this invention is to provide a fan device having an ultra thin-type structure for reducing an axial thickness, wherein a flat-type impeller provides with an annular supporting plate and a set of bent vanes connected thereto. Accordingly, the simplified construction of the flat-type impeller can reduce an entire axial thickness of the fan device.

The secondary objective of this invention is to provide the fan device having an ultra thin-type structure for reducing an axial thickness, wherein the annular supporting plate of the flat-type impeller is directly positioned and sandwiched in between an assembling member and a magnet sheet. Accordingly, the assembly of the impeller and the assembling member can further simplify the entire structure of the fan device.

Another objective of this invention is to provide the fan device including a magnet sheet attached to the impeller, and at least one stator coil mounted on a base plate which is made from a magnetically conductive material. The magnet sheet has an axial alignment with the stator coil such that formed between the magnet sheet and the stator coil is an axial air gap having a minimum distance. Accordingly, an alternative magnet field generated from the stator coil can steadily cooperate with a magnetic field of the magnet sheet.

Another objective of this invention is to provide the fan device including the base plate to provide with a magnetically balancing plate to cooperate with the magnetic field of the magnet sheet. Accordingly, the magnetically balancing plate of the base plate can balance rotation of the impeller with respect to the fan device.

The fan device in accordance with an aspect of the present invention includes a base plate, a flat-type impeller, an assembling member, a magnet sheet and a shaft member. The base plate includes an axial hole and at least one stator coil arranged thereon. The flat-type impeller is formed with an annular supporting plate and a series of bent vanes while the assembling member is formed with an assembling hole and an upraised flange. The magnet sheet provides with at least one pair of alternatively opposite magnetic poles (i.e. north pole and south pole). In assembling, a first distal end of the shaft member is extended through the flat-type impeller and inserted into the assembling hole of the assembling member. Correspondingly, a second distal end of the shaft member is inserted into the axial hole of the base plate. The flat-type impeller is directly positioned and sandwiched in between the assembling member and the magnet sheet so as to constitute a thin-type structure.

In a separate aspect of the present invention, the base plate further includes a magnetically balancing plate to cooperate with a magnetic field of the magnet sheet.

In a further separate aspect of the present invention, a bearing member is received in the axial hole of the base plate.

In a yet further separate aspect of the present invention, a bearing member is received in the assembling hole of the assembling member.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
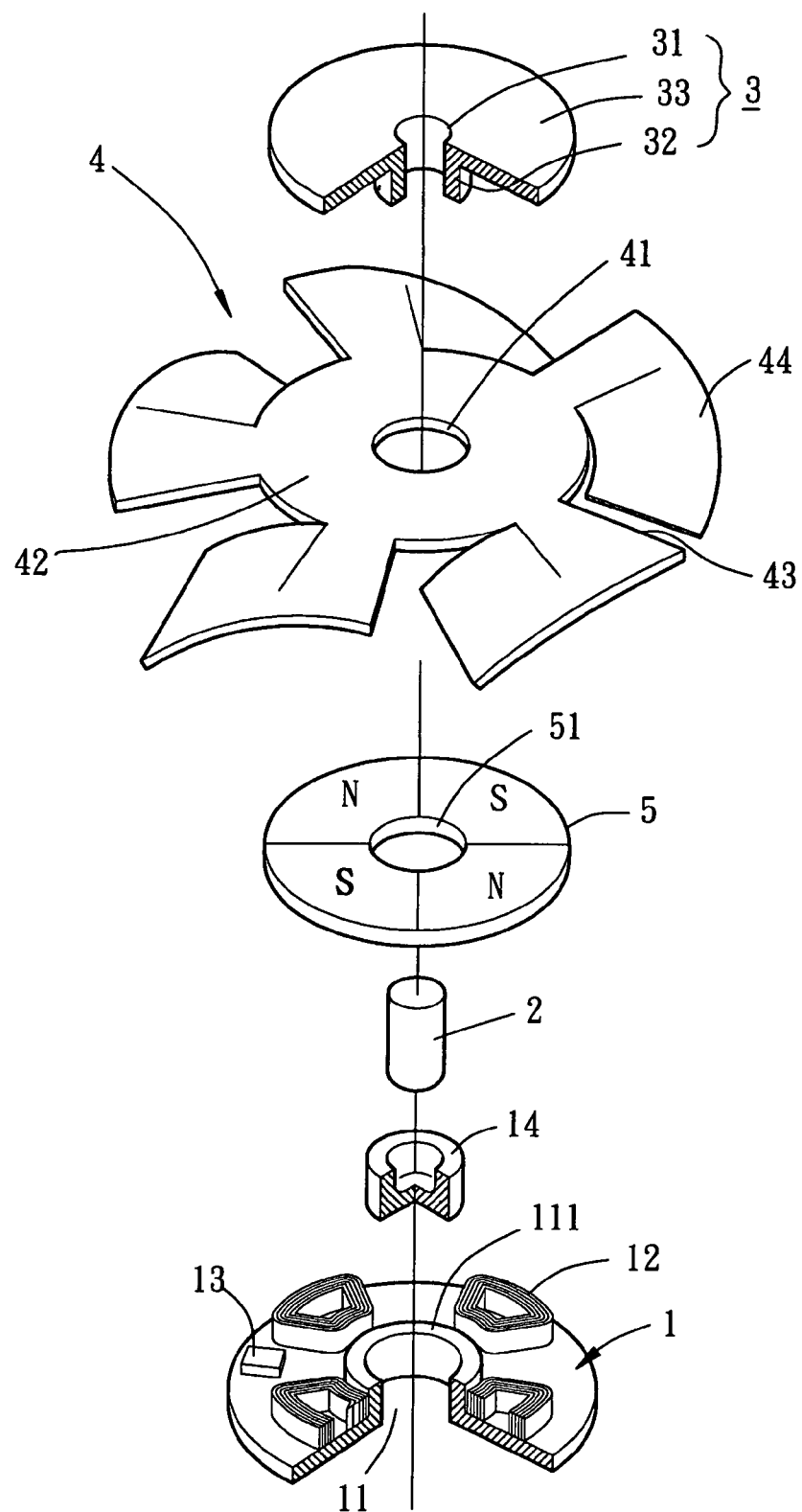
FIG. 1 is an exploded perspective view of a fan device having an ultra thin-type structure in accordance with a first embodiment of the present invention.
Figure 2:
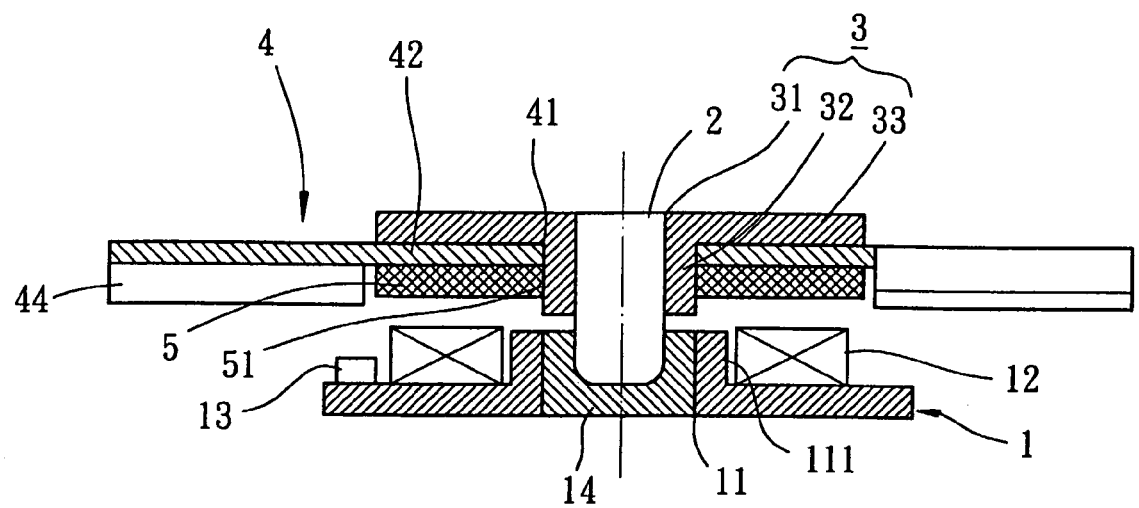
FIG. 2 is an assembled cross-sectional view of the fan device having the ultra thin-type structure in accordance with the first embodiment of the present invention.

Referring now to FIGS. 1 and 2, a fan device having a thin-type structure with a minimum air gap in accordance with a first embodiment of the present invention is disclosed and may be installed in a compact personal computer or a notebook (not shown). In the first embodiment, the fan device generally includes a base plate designated numeral 1, a shaft member designated numeral 2, an assembling member designated 3, a flat-type impeller designated numeral 4, and a magnet sheet designated numeral 5. In the illustrated embodiment, it will be understood that the base plate 1 of the fan device is the construction of a motor stator while the assembly of the shaft member 2, the assembling member 3, the flat-type impeller 4 and the magnet sheet 5 is the construction of a motor rotor. The combination the flat-type impeller 4 with the magnet sheet 5 of the fan device having the ultra thin-type structure in accordance with the present invention has a thickness of about 3 mm or less than 3 mm. In other words, the ultra thin-type structure of the fan device can be designed to greatly reduce the thickness of the combination the assembling member 3 and the flat-type impeller 4 with the magnet sheet 5 of the rotor which is less than 3 mm.

Still referring to FIGS. 1 and 2, constructions of the base plate 1 in the first embodiment shall be described in detail. Typically, the base plate 1 is made from a magnetically conductive material, such as iron or ferroalloy. The base plate 1 includes an axial hole 11, a plurality of stator coils 12, a driving member 13 and a bearing member 14. In the preferred embodiment, the axial hole 11 is located at a predetermined position, and constructed from a through hole connected between opposite surfaces of the base plate 1. Preferably, the axial hole 11 is provided with an annular upraised wall to form an axial tube 111 for fitting the bearing member 14 therein. Each of the stator coils 12 has an ordinary or common form of the coil which is flat in form. The stator coils 12 are arranged to mount around the axial hole 11 of the base plate 1. The stator coils 12 can generate alternatively magnetic fields in the event of alternatively opposite currents. Preferably, the driving member 13 is selected from a one-piece IC member, and used to detect changes in poles of the magnet sheet 5 in rotational operation. According to the design need, a number of electronic components of a driving circuit (not shown) are incorporated into the one-piece IC member in ordinary and common form. In practice, the driving member 13 can control the stator coils 12 to generate alternatively magnetic fields. In a preferred embodiment, the driving member 13 is located between any two of the adjacent stator coils 12, and on an outer periphery of the base plate 1. In the first embodiment, the bearing member 14 has a barrel-like shape and can withstand normal usage of the rotational movement of the impeller 4. In assembling, the bearing member 14 is fitted in the axial tube 111 to seal the axial hole 11 by an ordinary pressing manner. The bearing member 14 can rotatably receive the shaft member 2 and limit a certain extent of an axial movement of the shaft member 2.

Still referring to FIGS. 1 and 2, constructions of the assembling member 3 in the first embodiment shall be described in detail. In the first embodiment, the assembling member 3 is made from a magnetically conductive material, such as iron or ferroalloy, and formed with an assembling hole 31, an upraised flange 32 and an annular flange 33. The upraised flange 32 is extended downwardly in a longitudinal direction, as best shown in a downward direction in FIG. 2. The annular flange 33 is disposed on an outer periphery of the assembling hole 31. In assembling, an inner circumference of the upraised flange 32 engages with an outer surface of the shaft member 2 while an outer circumference of the upraised flange 32 extends through the flat-type impeller 4 and the magnet sheet 5. In this manner, the annular flange 33 is attached to a top surface of the flat-type impeller 4.

Still referring to FIGS. 1 and 2, constructions of the flat-type impeller 4 in the first embodiment shall be described in detail. Generally, a punching, molding or casting process can selectively manufacture the flat-type impeller 4 of the present invention. Preferably, the flat-type impeller 4 is made from a plastic or malleable material such that a single punching operation can be used to manufacture the flat-type impeller 4 and no bending operations are required. In punching operation, the flat-type impeller 4 of the first embodiment is a one-piece member to provide with a center through hole 41, an annular supporting plate 42, a series of cutaway portions 43 and a series of bent vanes 44. The center through hole 41 is located a center point of the annular supporting plate 42 to permit extension of the shaft member 2. Concretely, the cutaway portions 43 are equi-spaced on an outer periphery of the annular supporting plate 42, and each of which is used to form each of the corresponding bent vane 44. In a preferred embodiment, each of the bent vanes 44 is longitudinally bent to extend along an axis of the flat-type impeller 4, but each of the bent vanes 44 is bent to tilt with respect to the axis of the flat-type impeller 4. Consequently, the bent vanes 44 of the flat-type impeller 4 are propeller-type fan blades so as to generate an axial airflow while rotation. Preferably, the material of the flat-type impeller 4 has a high degree of malleability of metal or plasticity of plastic. For example, the material of the flat-type impeller 4 can be selected from a group consisting of copper, aluminum, iron, and alloys thereof, or a group consisting of polyimide (PI), polyamide (PA), polyester (PE), and mixtures thereof. After punching operation, the bent vanes 44 of the flat-type impeller 4 commonly occupy a section of an axial thickness of the fan device in the event.

Still referring to FIGS. 1 and 2, constructions of the magnet sheet 5 in the first embodiment shall be described in detail. In the first embodiment, the magnet sheet 5 has an ordinary or common form of a magnet which is circular and flat in form. Generally, the magnet sheet 5 includes a center through hole 51 which permits extension of the shaft member 2. Preferably, the magnet sheet 5 has a surface to provide with two pair of alternatively opposite magnetic poles (i.e. north poles and south poles) to have axial alignment with the stator coils 12. In rotating operation, the stator coils 12 of the base plate 1 can repulse the alternatively opposite magnetic poles of the magnet sheet 5 to drive the flat-type impeller 4 for rotation about an axis of the base plate 1. Namely, the motor rotor possessing the assembling member 3, the flat-type impeller 4 and the magnet sheet 5 rotates about an axis of the base plate 1. Preferably, the magnet sheet 5 is integrally formed with the alternatively opposite magnetic poles which can attract the annular flange 33 of the assembling member 3 for positioning the flat-type impeller 4 therebetween. Accordingly, a magnetic force of the magnet sheet 5 naturally attracts the assembling member 3 via a thin thickness of the flat-type impeller 4 so that the magnet sheet 5 is coupled to the annular supporting plate 42 of the flat-type impeller 4. Preferably, the magnet sheet 5 coupled to the flat-type impeller 4 has a thickness not greater than that of the bent vane 44 of the flat-type impeller 4. Once assembled, the upraised flange 32 and the annular flange 33 of the assembling member 3 separate the magnet sheet 5 from other motor members. Accordingly, the bent vane 44 of the flat-type impeller 4 and the magnet sheet 5 commonly share at least one section of an axial thickness of the fan device.

Assembled relationships of the shaft member 2, the assembling member 3, the flat-type impeller 4 and the magnet sheet 5 in accordance with the first embodiment shall be described with reference to FIG. 2. In the first embodiment, a first distal end of the shaft member 2 is successively extended through the center through holes 41, 51 of the flat-type impeller 4 and the magnet sheet 5, and is tightly fitted in the assembling hole 31 of the assembling member 3 in the event. As previously noted, the adequate magnetic force of the magnet sheet 5 penetrating an ultra thin thickness of the annular supporting plate 42 of the flat-type impeller 4 naturally attracts the assembling member 3 so that the magnet sheet 5 is coupled to the annular supporting plate 42 of the flat-type impeller 4. Owing to the magnet sheet 5 coupled to the annular supporting plate 42 of the flat-type impeller 4 by the assembling member 3, the total thickness of the annular flange 33 of the assembling member 3, the flat-type impeller 4 and the magnet sheet 5 is less than 3 mm. In another embodiment, if desired, the assembling member 3 and the magnet sheet 5 are coupled to the annular supporting plate 42 of the flat-type impeller 4 by using a suitable amount of adhesive in increasing an assembled strength. Lastly, a second distal end of the shaft member 2 is extended through and rotatably received in the bearing member 14 mounted in the axial hole 11 of the base plate 1 so as to constitute the thin-type structure of the fan device. Once assembled, formed between the stator coil 12 and the magnet sheet 5 is a minimum air gap which occupies as a minimum length of the section of the axial thickness of the fan device as possible.

Owing to the flat forms of the stator coils 12, the assembling member 3, the flat-type impeller 4 and the magnet sheet 5, this permits forming bent vane 44 of the flat-type impeller 4 in a single punching process for ease of manufacture. Also, this permits assembling the base plate 1 and the flat-type impeller 4 by the shaft member 2 in a simplified manner such that the axial thickness of the fan device can be greatly reduced. When turning the flat-type impeller 4, a portion of the magnet sheet 4 can create a magnetic force to attract the base plate 1 which is preferably made from the magnetically conductive material. When this occurs, the start-up and the rotational movement of the flat-type impeller 4 can be balanced and steadied. Consequently, an axial movement of the flat-type impeller 4 relative to the base plate 1 can be avoided, as best shown in FIG. 2.

Still referring to FIG. 2, when completely assembled, a minimum air gap is formed between the stator coils 12 and the magnet sheet 5 relative to an axis of the fan device in the event. Advantageously, the minimum air gap so formed between the stator coils 12 and the magnet sheet 5 facilitates in reducing the entire axial thickness of the compact fan device.

Figure 3:
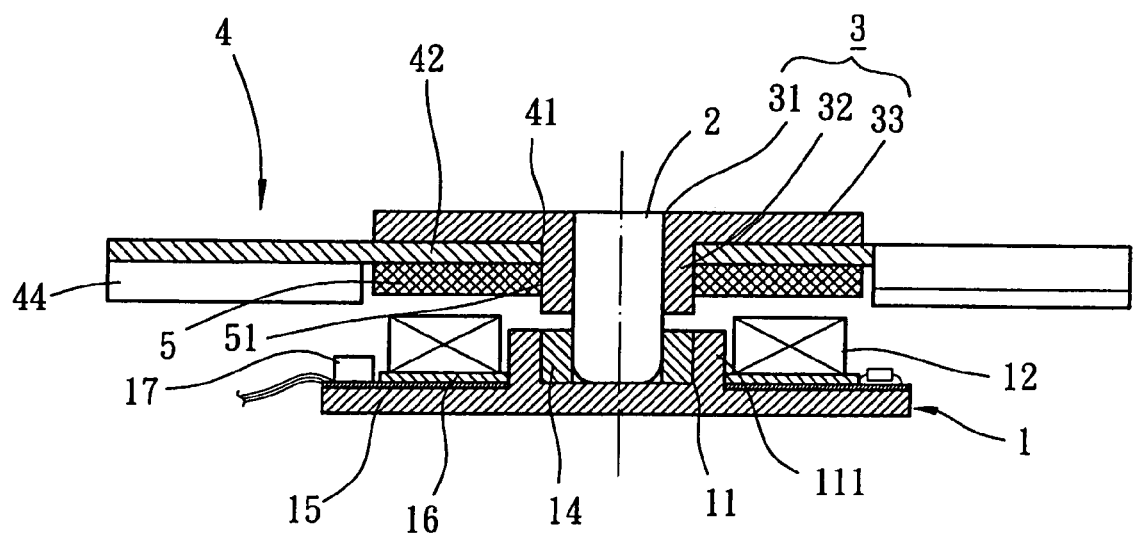
FIG. 3 is an assembled cross-sectional view, similar to FIG. 2, of the fan device having the ultra thin-type structure in accordance with a second embodiment of the present invention.

Turning now to FIG. 3, a view of the fan device having the thin-type structure in accordance with a second embodiment of the present invention is illustrated. In comparison with the first embodiment, the base plate 1 of the second embodiment is made from non-magnetically conductive material, and is combined with a printed circuit board 15, at least one magnetically balancing plate 16 and a sensor element 17. In assembling, the printed circuit board 15 and the magnetically balancing plate 16 are sandwiched in between the base plate 1 and the stator coils 12. In the second embodiment, the magnetically balancing plate 16 is circular, rectangular or fan-shaped in form for corresponding to the shape of the stator coil 12. Mounted on the printed circuit board 15 is the sensor element 17 which is located at a position adjacent to one of the stator coils 12 or between any two of the stator coils 12. The printed circuit board 15 provides with several electronic components to constitute a driving circuit which is electrically connected with the sensor element 17 for receiving a detected signal of rotation of the flat-type impeller 4. In response to the detected signal of rotation of the flat-type impeller 4, the driving circuit provided on the printed circuit board 15 can control the stator coils 12 to generate an alternatively magnetic field. When turning the flat-type impeller 4, a portion of the magnet sheet 5 can create a magnetic force to attract the magnetically balancing plate 16 which is made from the magnetically conductive material. When this magnetic force occurs, the start-up and the rotational movement of the flat-type impeller 4 can be balanced and steadied. Consequently, an axial movement of the flat-type impeller 4 relative to the base plate 1 can be avoided.

In a preferred embodiment, the axial hole 11 of the base plate 1 is formed in a blind hole in communication with a top surface of the base plate 1. The axial hole 11 of the base plate 1 is used to accommodate the bearing member 14. In this preferred embodiment, the bearing member 14 is constructed from a tubular member which is rigid to withstand normal rotation or usage of the shaft member 2. In assembling, a distal end of the shaft member 2 extends through the bearing member 14 and engages with a bottom surface of the axial hole 11.

Figure 4:
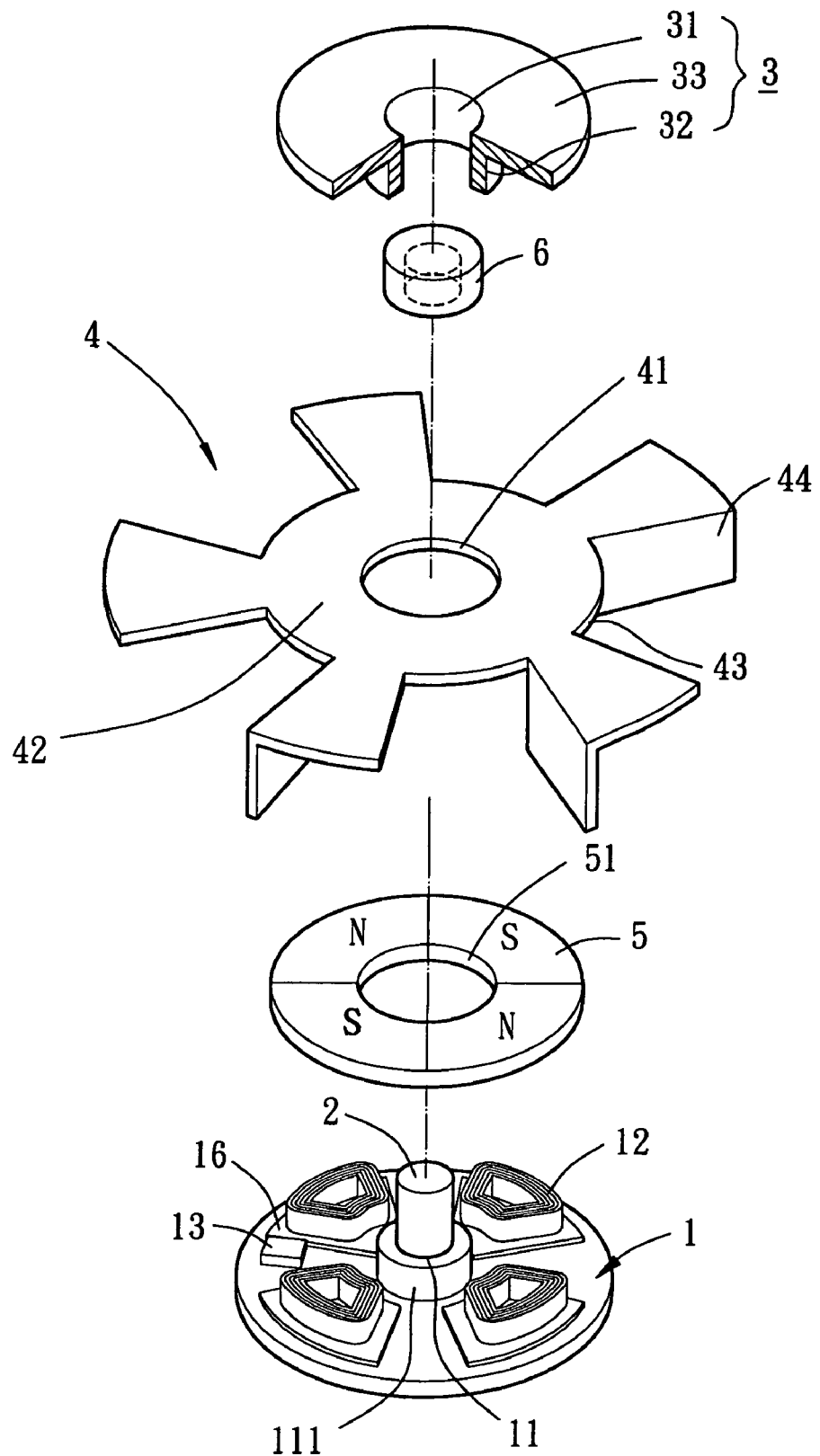
FIG. 4 is an exploded perspective view of the fan device having the ultra thin-type structure in accordance with a third embodiment of the present invention.
Figure 5:
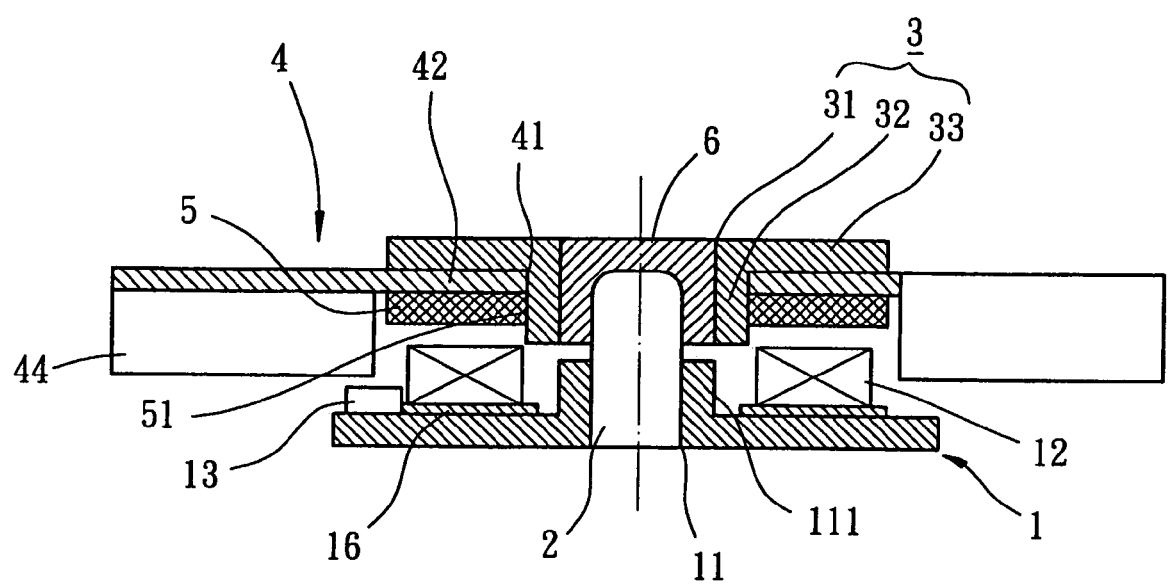
FIG. 5 is an assembled cross-sectional view of the fan device having the ultra thin-type structure in accordance with the third embodiment of the present invention.

Turning now to FIGS. 4 and 5, views of the fan device having the thin-type structure in accordance with a third embodiment of the present invention are illustrated. In comparison with the first embodiment, the base plate 1 of the third embodiment is made from non-magnetically conductive material, and is combined with a printed circuit board 15, at least one magnetically balancing plate 16 and a sensor element 17. In the third embodiment, the bearing member 14 mounted in the axial hole 11 of the base plate 1 is omitted. Instead, a bearing member 6 is received in the assembling hole 31 of the assembling member 3 for rotatably receiving the first distal end of the shaft member 2. In a preferred embodiment, the bearing member 6 has a barrel-like shape and can withstand normal usage of the rotational movement of the impeller 4. In assembling, a first distal end of the shaft member 2 is successively extended through the center through holes 41 of the flat-type impeller 4 and the magnet sheet 5, and is rotatably received in the bearing member 6 in the event. Correspondingly, a second distal end of the shaft member 2 is extended through and tightly fitted in the axial hole 11 of the base plate 1 so as to constitute the thin-type structure of the fan device.

In the third embodiment, each of the bent vanes 44 is bent in parallel with an axis of the flat-type impeller 4. Consequently, the bent vanes 44 of the flat-type impeller 4 are blower-type fan blades so as to generate an action of blast in radial directions while rotation. In an alternative embodiment, each of the bent vanes 44 is longitudinally bent to extend along an axis of the flat-type impeller 4, but each of the bent vanes 44 is bent to tilt with respect to the axis of the flat-type impeller 4. Consequently, the bent vanes 44 of the flat-type impeller 4 are propeller-type fan blades so as to generate an axial airflow while rotation.

It will be apparent from the aforementioned discussions that the conventional fan device, disclosed in U.S. Pat. No. 5,217,351, has the stator coil and the magnet ring member being flat in form for reducing the thickness of the combination of the motor rotor with the motor stator. However, there are a number of design limitations existing for the conventional fan device due to difficulties in manufacture and assembly. Inevitably, the rotor hub of the impeller occupies a greater section of the axial thickness of the conventional fan device. Conversely, as best shown in FIG. 1, the bent vanes 44 of the flat-type impeller 4 of the present invention can be formed in a single punching process for ease of manufacture and reduction in thickness. In addition, the assembling member 3 can directly mount the magnet sheet 5 on the annular supporting plate 42 of the flat-type impeller 4 by an attraction of the magnet sheet 5 for the assembling member 3 for further reduction in thickness. Consequently, the thicknesses of the base plate 1, the assembling member 3, the flat-type impeller 4 and the magnet sheet 5 can implement reduction of the entire axial thickness of the fan device.

Although the invention has been described in detail with reference to its presently preferred embodiment, it will be understood by one of ordinary skill in the art that various modifications can be made without departing from the spirit and the scope of the invention, as set forth in the appended claims.

What is claimed is:

1. A fan device having an ultra thin-type structure, comprising:

a base plate including an axial hole and at least two stator coils;

a shaft member having a first distal end and a second distal end arranged in opposite directions;

a flat-type impeller including a center through hole, an annular supporting plate and a plurality of bent vanes;

an assembling member formed with an assembling hole and an annular flange, the annular flange disposed on an outer periphery of the assembling hole; and a magnet sheet providing with a center through hole and at least one pair of alternatively opposite magnetic poles axially aligning with the stator coil;

wherein the first distal end of the shaft member is successively extended through the center through holes of the flat-type impeller and the magnet sheet, and is inserted into the assembling hole of the assembling member;

wherein the second distal end of the shaft member is inserted into the axial hole of the base plate so as to constitute the thin-type structure; and wherein a minimum air gap is formed between the stator coils and the magnet sheet relative to an axis of the fan device such that the minimum air gap so formed between the stator coils and the magnet sheet occupies a minimum length of an axial thickness of the fan device.

2. The fan device having the ultra thin-type structure as defined in claim 1, wherein the flat-type impeller is a one-piece member to provide with a plurality of cutaway portions which are equi-spaced on an outer periphery of the annular supporting plate, and each of which is used to form each of the corresponding bent vanes.

3. The fan device having the,ultra thin-type structure as defined in claim 2, wherein each of the bent vanes is longitudinally bent to extend along an axis of the flat-type impeller, each of the bent vanes is bent to tilt with respect to the axis of the flat-type impeller so that the bent vanes of the flat-type impeller are propeller-type fan blades so as to generate an axial airflow while rotation.

4. The fan device having the ultra thin-type structure as defined in claim 2, wherein each of the bent vanes is bent in parallel with an axis of the flat-type impeller so that the bent vanes of the flat-type impeller are blower-type fan blades so as to generate an action of blast in radial directions while rotation.

5. The fan device having the ultra thin-type structure as defined in claim 1, wherein the assembling member is made from a magnetically conductive material such that a magnetic force of the magnet sheet attracts the assembling member via a thin thickness of the flat-type impeller in assembling the flat-type impeller and the magnet sheet.

6. The fan device having the ultra thin-type structure as defined in claim 1, wherein the assembling member and the magnet sheet are coupled to the annular supporting plate of the flat-type impeller by adhesive.

7. The fan device having the ultra thin-type structure as defined in claim 1, wherein when turning the flat-type impeller, a portion of the magnet sheet creates a magnetic force to attract the base plate made from a magnetically conductive material.

8. The fan device having the ultra thin-type structure as defined in claim 1, further including a magnetically balancing plate, when turning the flat-type impeller, a portion of the magnet sheet creates a magnetic force to attract the magnetically balancing plate made from a magnetically conductive material.

9. The fan device having the ultra thin-type structure as defined in claim 1, wherein the axial hole of the base plate is formed in a through hole or a blind hole in which to accommodate the bearing member.

10. The fan device having the ultra thin-type structure as defined in claim 1, wherein the axial hole is provided with an annular upraised wall to form an axial tube for fitting the bearing member therein.

11. The fan device having the ultra thin-type structure as defined in claim 10, wherein the bearing member is constructed from a barrel-like member or a tubular member.

12. The fan device having the ultra thin-type structure as defined in claim 1, further including a sensor element for detecting a signal of rotation of the flat-type impeller.

13. The fan device having the ultra thin-type structure as defined in claim 12, further including a printed circuit board and at least one electronic component mounted thereon, the electronic components controlling the stator coils to generate an alternatively magnetic field in response to the detected signal of rotation of the flat-type impeller from the sensor element.

14. The fan device having the ultra thin-type structure as defined in claim 1, further including a driving member used to detect changes in poles of the magnet sheet in rotational operation, thereby controlling the stator coils to generate an alternatively magnetic field.

15. The fan device having the ultra thin-type structure as defined in claim 1, wherein the assembling member further includes an upraised flange having an inner circumference engaging with an outer surface of the shaft member, and an outer circumference through which to extend the central through holes of the flat-type impeller and the magnet sheet.

16. The fan device having the ultra thin-type structure as defined in claim 15, wherein the assembling member further includes a bearing member mounted in the assembling hole for rotatably receiving the first distal end of the shaft member.

17. The fan device having the ultra thin-type structure as defined in claim 16, wherein the bearing member is constructed from a barrel-like member.

18. The fan device having the ultra thin-type structure as defined in claim 1, wherein the axial hole of the base plate is provided with an axial tube to tightly fit the second distal end of the shaft member.

* * * * *